(12) United States Patent
Amaral et al.

(10) Patent No.: US 7,031,306 B2
(45) Date of Patent: Apr. 18, 2006

(54) TRANSMITTING MPEG DATA PACKETS RECEIVED FROM A NON-CONSTANT DELAY NETWORK

(75) Inventors: John M. Amaral, Roxborough, MA (US); David R. Davis, Leominster, MA (US); Edmund P. Chin, Hudson, MA (US); John M. Vincent, Tynsboro, MA (US); Michael P. Healey, Northborough, MA (US); Jeffrey C. Landrum, Charlton, MA (US)

(73) Assignee: Artel Video Systems, Inc., Marlborough, MA (US)

( * ) Notice: Subject to any disclaimer, the term of this patent is extended or adjusted under 35 U.S.C. 154(b) by 960 days.

(21) Appl. No.: 09/814,453

(22) Filed: Mar. 22, 2001

(65) Prior Publication Data

US 2002/0024970 A1 Feb. 28, 2002

Related U.S. Application Data

(60) Provisional application No. 60/195,850, filed on Apr. 7, 2000.

(51) Int. Cl.
*H04J 3/06* (2006.01)
(52) U.S. Cl. ................................ 370/389; 370/517
(58) Field of Classification Search ................ 370/516, 370/517, 519
See application file for complete search history.

(56) References Cited

U.S. PATENT DOCUMENTS

| | | | | |
|---|---|---|---|---|
| 5,467,342 A | | 11/1995 | Logston et al. ............... 370/17 |
| 5,526,362 A | * | 6/1996 | Thompson et al. ......... 370/516 |
| 5,533,021 A | * | 7/1996 | Branstad et al. ............ 370/396 |
| 5,640,388 A | * | 6/1997 | Woodhead et al. ......... 370/468 |
| 5,828,414 A | | 10/1998 | Perkins et al. |
| 5,966,387 A | | 10/1999 | Cloutier ...................... 370/516 |
| 6,002,687 A | | 12/1999 | Magee et al. |
| 6,118,786 A | | 9/2000 | Tiernan et al. |
| 6,195,701 B1 | | 2/2001 | Kaiserswerth et al. |
| 6,262,776 B1 | | 7/2001 | Griffits ....................... 348/512 |
| 6,360,271 B1 | | 3/2002 | Schuster et al. ............ 709/231 |
| 6,377,588 B1 | | 4/2002 | Osaki ......................... 370/508 |

FOREIGN PATENT DOCUMENTS

| | | |
|---|---|---|
| EP | 0987894 | 3/2000 |
| WO | WO95/25313 | 9/1995 |
| WO | WO 95/25313 | 9/1995 |
| WO | WO97/28652 | 8/1997 |

OTHER PUBLICATIONS

International Search Report.
International Search Report
International Search Report for Application No. EP01920820.

* cited by examiner

*Primary Examiner*—Huy D. Vu
*Assistant Examiner*—Daniel Ryman
(74) *Attorney, Agent, or Firm*—Fish & Richardson P.C.

(57) ABSTRACT

Transmitting data packets received from a non-constant delay medium includes storing the data packets in a buffer, determining a play-out schedule for the data packets based on timing information in the data packets, and transmitting the data packets from the buffer in accordance with the play-out schedule. Two of the data packets may contain time-stamps and the play-out schedule may be determined based on a difference between the time-stamps.

26 Claims, 5 Drawing Sheets

TRANSMITTING MPEG DATA PACKETS RECEIVED FROM A NON-CONSTANT DELAY NETWORK

CROSS-REFERENCE TO RELATED APPLICATION

This application claims priority from U.S. Provisional Application No. 60/195,850, filed Apr. 7, 2000, the contents of which are incorporated herein by reference.

TECHNICAL FIELD

This invention relates generally to buffering MPEG (Motion Picture Experts Group) data packets received from a non-constant delay network and transmitting the data packets from the buffer at a determined play-out rate.

BACKGROUND

Transmission of an MPEG transport stream is predicated on the use of a constant-delay transmission medium. A constant-delay transmission medium is a physical medium over which different MPEG data packets take the same amount of time to get from an MPEG transmitter/encoder to an MPEG decoder/receiver. The need for a constant-delay transmission medium is explained as follows.

The MPEG specifications call for an MPEG encoder to insert program clock references (PCRs) into MPEG transport streams containing MPEG-compressed audio and video data packets. PCRs are time-stamps used by an MPEG receiver to synchronize the presentation and recreation of audio and video information in the packets. The MPEG receiver uses information in the PCRs to generate local time-stamps, which are used in decoding the transport stream.

More specifically, when decoding a transport stream, the MPEG receiver compares the local time-stamps to PCRs inserted in the transport stream by the MPEG encoder. Differences between the local time-stamps and the PCRs constitute errors indicative of an instantaneous frequency difference between the clock that generated the PCRs and a local clock that generates the local time-stamps. The MPEG receiver uses these errors to synchronize the local clock with the clock that generated the PCRs. By synchronizing the clocks, the video and audio can be reproduced more accurately by the MPEG decoder/receiver.

When PCRs are transmitted from the MPEG encoder to the MPEG receiver at a rate that is not constant (this is referred to as "jitter" in the transmission), the foregoing clock synchronization process confuses error induced by non-constant data packet transmission with inherent error between the encoder (PCR) and receiver clocks. As a result, errors increase on average, causing unacceptably poor audio and video recovery by the MPEG decoder.

SUMMARY

This invention enables MPEG data packets to be transmitted over non-constant data transmission media, such as a wide area network (WAN), without introducing large amounts of error into the transports stream. The invention does this by buffering MPEG data packets and reading out the buffered MPEG data packets at an appropriate play-out rate. By handling the MPEG data packets in this manner, the invention effectively mimics a constant-delay transmission medium at the receiver, thereby allowing an MPEG decoder to perform more accurate audio and video recovery. Moreover, this is done, for the most part, without altering the PCRs, thereby reducing processing time and chances for error.

In general, in one aspect, the invention is directed to a method of transmitting data packets received from a non-constant delay medium. This aspect features storing the data packets in a buffer, determining a play-out schedule for the data packets based on timing information in the data packets, and transmitting the data packets from the buffer in accordance with the play-out schedule. This aspect may include one or more of the following features.

Two of the data packets may contain time-stamps and the play-out schedule may be determined based on a difference between the time-stamps. The play-out schedule may control play-out of the two data packets at times that correspond to the time-stamps. Data packets that do not contain time-stamps may be transmitted between the two data packets such that a delay exists between a second one of the two data packets and a last one of the data packets that do not contain time stamps. The data packets that do not contain time stamps may be transmitted at a higher rate in order to reduce the delay.

A data stream to which the two data packets belong may be identified. The play-out schedule may be determined based also on the identified data stream. The data stream may be identified based on a packet identifier in the two data packets. The data stream may include an MPEG program stream that includes audio and video information.

If the play-out schedule indicates that first and second data packets are to be transmitted at the same time, timing information in the second data packet may be changed to indicate that the second data packet is to be transmitted after the first data packet. The first and second data packets may belong to first and second data streams, respectively. Timing information may be changed in other packets in the second data stream as well.

An occupancy level of the buffer may be determined and a frequency of a clock signal may be changed based on the occupancy level of the buffer. The frequency of the clock signal may be changed so that the frequency corresponds to the frequency of a clock signal that was used by a device to produce the data packets.

Other features and advantages of the invention will become apparent from the following description, including the claims and drawings.

DESCRIPTION

Figure 1:
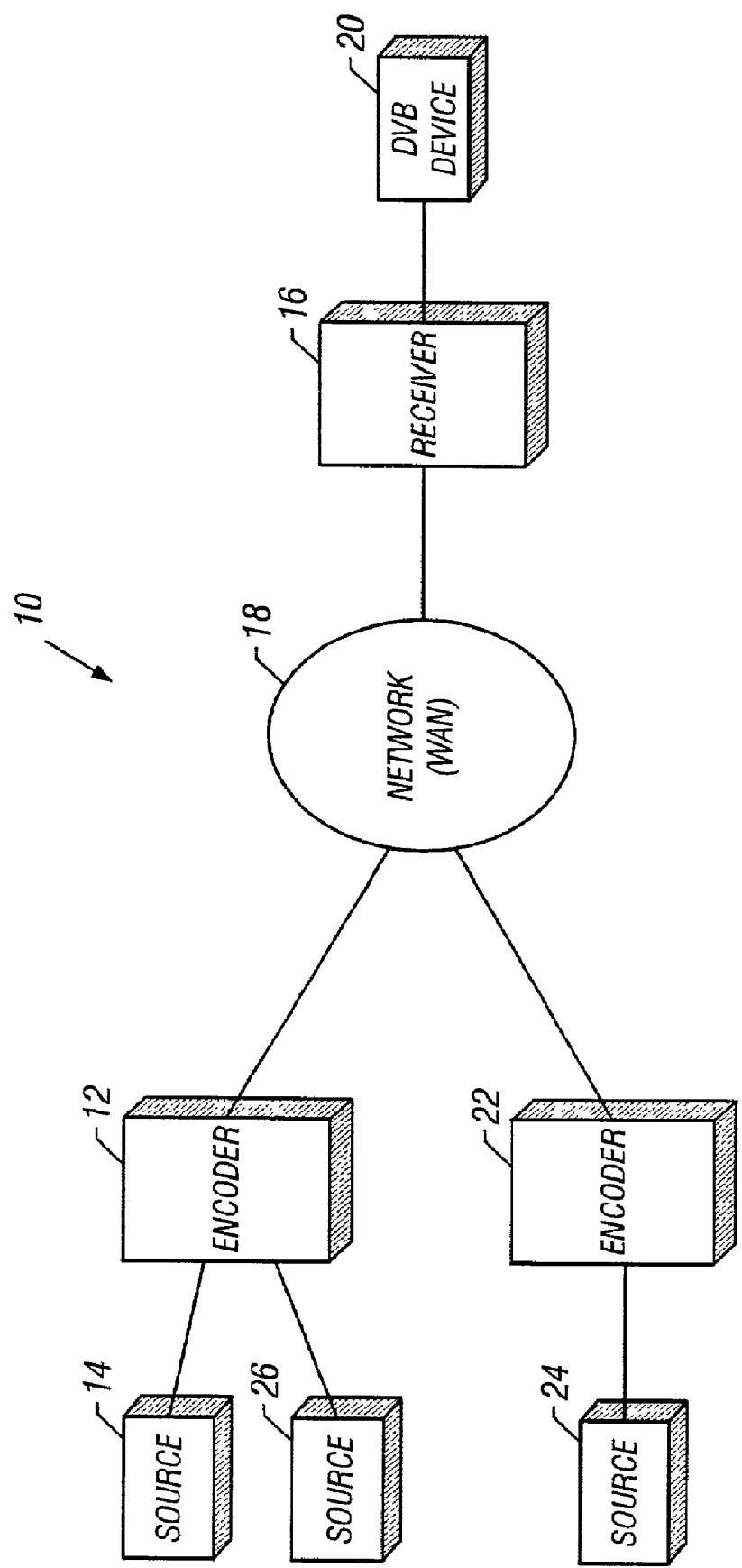
FIG. 1 is a block diagram of a network containing an MPEG transmitter/encoder and an MPEG receiver.

FIG. 1 shows a network 10. Network 10 is a wide area network (WAN), such as the Internet, although any non-constant-delay transmission medium may be used. Network 10 includes an MPEG encoder 12, which receives video from a source 14, such as a video camera. Encoder 12 and source 14 may themselves be connected by a network.

Encoder 12 compresses video received from source 14 to create an MPEG transport stream comprised of MPEG data packets.

Encoder 12 transmits the MPEG transport stream to receiver 16 over network transmission medium 18, which may be telephone lines, Ethernet, wireless link, or the like. The transport streams may be transmitted via TCP/IP (Transmission Control Protocol/Internet Protocol), ATM (Asynchronous Transfer Mode), or any other protocol.

Receiver 16 receives one or more MPEG transport stream (s), identifies individual transport stream(s), and provides audio and video output to one or more DVB (Digital Video Broadcasting) device(s) 20. The received MPEG transport streams may be transmitted by separate encoders 12 and 22 from separate sources 14 and 24, respectively. In addition, different MPEG transport streams, which originate from different sources 14 and 26, may be transmitted by the same encoder 12.

Figure 2:
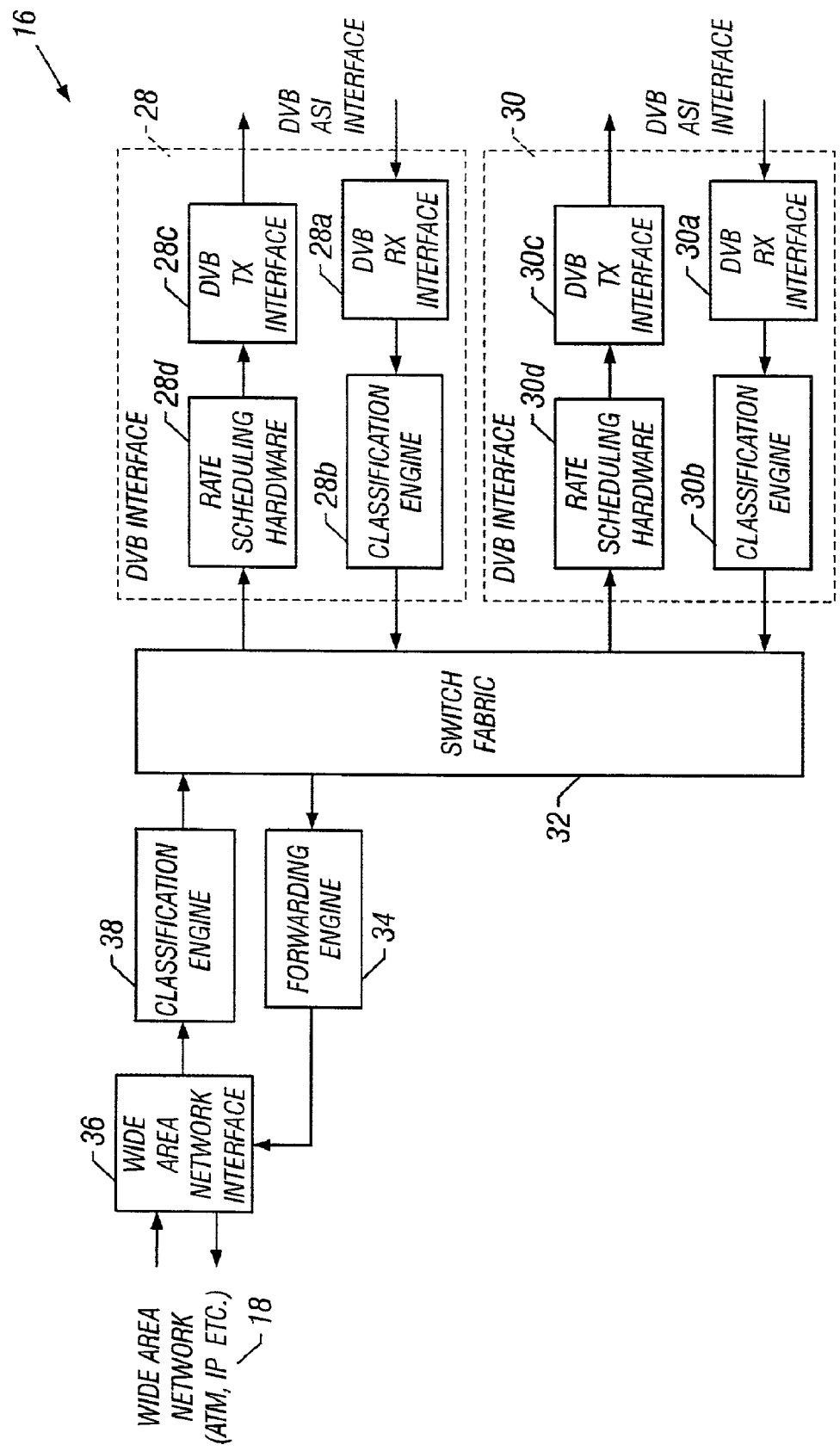
FIG. 2 is a high-level block diagram of circuitry contained in the MPEG receiver.

Referring to FIG. 2, a high-level block diagram of circuitry included in one embodiment of receiver 16 is shown. Receiver 16 includes two DVB device interfaces 28 and 30. Each DVB interface 28 and 30 also includes a DVB-ASI (Digital Video Broadcasting—Asynchronous Serial Interface) receive (Rx) interface 28a and 30a for receiving an MPEG transport stream, and a classification engine 28b and 30b for identifying multiple MPEG transport streams and outputting the transport streams to network 18 via switch fabric 32, forwarding engine 34, and network interface 36. The following, however, focuses first on receiving MPEG transport streams from network 18 and outputting those MPEG transport streams to DVB devices. To this end, each DVB interface 28 and 30 includes a DVB-ASI transmit (Tx) interface 28c and 30c for transmitting MPEG transport streams from buffers in switch fabric 32 to different DVB devices, and rate scheduling logic 28d and 30d for scheduling the play-out of those MPEG transport streams.

Network interface 36 may be one of a variety of physical interfaces to various ATM, IP, or other non-constant delay networks. Classification engine 38 receives MPEG packets from network interface 36 and classifies the packets using information in their headers.

In more detail, classification engine 38 uses content addressable memories (CAMS) (in switch fabric 32) to determine if received data packets are authorized for processing by receiver 16. CAMs are memories that are initialized with tables of data. The data in the CAMs is compared against MPEG data packet header routing fields extracted by logic in classification engine 38. When routing information of a data packet header matches one of the table entries in a CAM, the CAM outputs a tag (e.g., a twelve-bit binary number) called a virtual channel identifier (ID).

Classification engine 38 concatenates the virtual channel ID with a data payload contained in a data packet, any embedded time-stamps contained in the data packet, and a local time-stamp indicating the time that the data packet arrived at receiver 16. The local time-stamp is generated by classification engine 38 from a clock source (not shown in FIG. 2) on receiver 16. Switch fabric 32 uses the virtual channel ID's to associate a data packet containing a specific virtual channel ID to a switch fabric memory buffer dedicated to specific MPEG sources (e.g., sources 14 and 24 of FIG. 1) and destinations. That is, switch fabric 32 uses the virtual channel IDs to locate data associated with a particular MPEG transport stream from network 18, determine characteristics of that transport stream, and determine how that stream should be processed.

The path that the MPEG transport streams take through receiver 16 is via switch fabric 32. Switch fabric 32 can be conceptualized as a packet-aware cross-point switch. Logic implementing switch fabric 32 examines the virtual channel IDs concatenated with the incoming data packets and configures buffers and memories (e.g., buffers 40, 44, 46 in FIG. 3, described below) that are used to route the data packets from network interface 36 to any DVB-ASI interface 28, 30 designated by an end user.

In more detail, once data packets have been identified by classification engine 38, the data packets are stored in first-in-first-out (FIFO) data buffers in switch fabric 32. The FIFOs are managed in an SRAM (Static Random Access Memory) (not shown in FIG. 2) in switch fabric 32. Data transmission begins once a FIFO is half full. Data transmission, in this case, means emptying, i.e., playing-out, data packets from the FIFOs. Packet arrival jitter caused by non-constant delay transmission over network 18 is reduced when the FIFOs are emptied at the correct rate. This is because the rate and times at which the data packets are output from the FIFOs can be controlled, essentially approximating the constant delay transmission medium originally envisioned for MPEG transport streams. Thus, receiver 16 provides constant delay, allowing the receiver's incoming clock synchronization processes to operate correctly.

Figure 4:
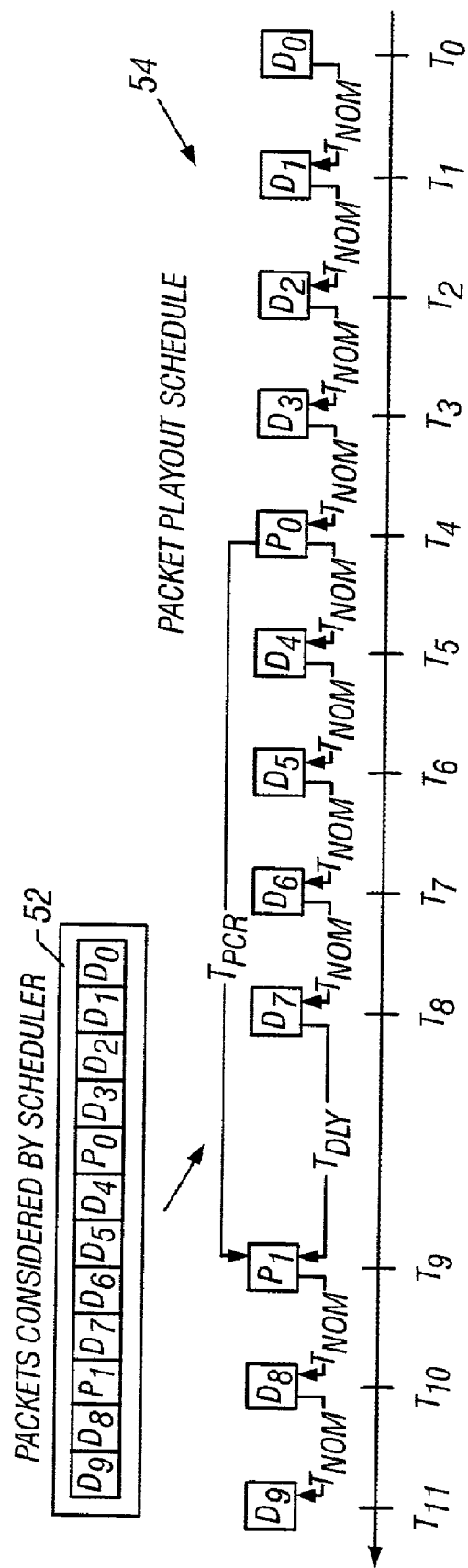
FIG. 4 shows a play-out schedule for MPEG data packets that is implemented by the MPEG receiver.

The rate at which the MPEG data packets are played-out out from the FIFOs is determined by rate scheduling logic 28d (or 30d, but since both operate identically, only logic 28d will be described). Rate scheduling logic 28d processes a set of packets 52 (FIG. 4) stored in a switch fabric memory buffer. As shown in FIG. 4, the set of packets may be a set of ten transport stream packets that do not contain PCR information (i.e., $D_0$ to $D_9$) and two transport stream packets that contain PCR information (i.e., $P_0$ and $P_1$). These latter two packets are referred to as "PCR packets" or simply "PCRs".

Rate scheduling logic 28d interprets timing information contained in the PCR packets to create a play-out schedule from the switch fabric FIFOs. Rate scheduling logic 29d reads the packets of the transport streams from the switch fabric FIFOs at the timing specified in the play-out schedule and transmits the packets to DVB Tx interface 28c. From DVB Tx interface 28c, data packet transport streams are provided to DVB device(s) 20.

In rate scheduling logic 28d, the intended bit transfer rate of a transport stream under consideration is determined by dividing the number of bits transmitted between any two PCR packets by the time difference indicated by those PCR packets. In this embodiment, the play-out rate is expressed as $$[\text{\#bits} * \text{\#packets}] / [TPCR_{P1} - TPCR_{P0}]. \tag{1}$$

In equation (1), "#bits" is the number of bits in an MPEG transport stream, "#packets" is the number of packets between, and including, PCR packets P0 or P1 (e.g., P0+D4+D5+D6+D7), and $TPCR_{P1}$ and $TPCR_{P0}$ are time-stamps in PCR packets P1 and P0, respectively.

The play-out schedule comprises a series of data packets 54 (FIG. 4) in an MPEG transport stream. The data packets are separated in time by a nominal delay ($T_{NOM}$) $T_{NOM}$ is a packet delay that produces a packet play-out rate that is slightly higher than the intended average play-out rate for the MPEG transport stream under consideration. This is done to reduce the difference ($T_{DLY}$) between the PCR packet play-out time ($T_{PCR}$) and the play-out time of non- PCR packets ($D_4$ to $D_7$) preceding a PCR packet ($P_1$) ($T_{DLY}=T_{PCR}-T_8$). The reason that $T_{DLY}$ is reduced is to reduce gaps in data transmission, as described below.

Each time a play-out schedule is fixed to its intended play-out time using the time difference between two sequential PCR packets, by definition, the play-out rate for the packets scheduled between the PCRs is the correct rate. Scheduling based on PCR time differences, combined with fine control of receiver 16's output transmitter clock frequency, is employed herein to reduce network jitter.

More particularly, once an output FIFO in switch fabric 32 has accumulated half of a buffer's worth of packets, play-out starts at a nominal (predetermined) rate until the first packet containing a PCR time-stamp ($P_0$) is detected. After the first PCR packet ($P_0$) is played-out, subsequent data packets ($D_4$ to $D_7$) in the FIFO are played-out at a slightly higher rate until the next PCR packet ($P_1$) from that transport stream is played-out. This is done in order to reduce TDLY. Reducing $T_{DLY}$ reduces the gap in transmission between packets $D_7$ and $P_1$. Once the last packet ($D_7$) is played-out, FIFO play-out and transmission are suspended until the difference in time specified by the PCR packets ($T_{PCR}$) has elapsed. Waiting for the proper time forces the PCRs to be played-out with the proper time delay between PCRs, thereby reducing network-induced jitter. With the network jitter reduced, MPEG decoders/receivers can use normal clock synchronization processes to produce correct play-out results.

The foregoing approach can be extended to multiple MPEG transport streams (MPTS). Rate scheduling logic 28*d* does this by identifying packets from a data stream using a PCR packet identifier (PID), which uniquely identifies an MPEG transport stream. The play-out time of a packet is determined as above, based on sequential PCR packets in the MPEG transport stream identified by the PID. That is, during play-out of multiple transport streams, PCR packets with previously-unidentified PIDs are played-out of the switch fabric buffers until a second PCR packet having a previously-identified PID is encountered. This means that both PCRs are from the same MPEG transport stream. Once two PCRs from the same MPEG transport stream have been identified, packet buffer play-out and transmission are suspended until the proper play-out time is reached, as described above. The play-out times are based on time differences in PCR packets for each individual stream.

One complication that can occur with the foregoing schedule-based play-out process occurs when PCR packets from different transport streams (i.e., multiple PIDs) need to be played-out at the same time. That is, two PCR packets may have the same timing information. The two PCR packets are thus likely to be from different transport streams. In this case, there is an opportunity for the schedule derived from the PCR information in the PCR packets to indicate simultaneous play-out. This is considered a "collision" because each receiver's output interface (e.g., 28, 30) cannot play-out two packets simultaneously. To remedy this, rate scheduling logic 28*d* delays the second of the two PCR packets in the play-out schedule, along with any other packets in the same MPEG transport stream as the second packet, if necessary. The time delay is equal to the time it takes for the output interface to play the previous packet. The PCR contained in the packet(s) that are delayed is compensated, i.e., changed, to account for the delay added to the schedule.

One difference between other MPEG receivers and receiver 16 is that, in receiver 16, incoming MPEG data packets are not altered except when a collision between packets occurs during "de-jittering". Other MPEG receivers modify many MPEG data packet time-stamps in an attempt to dejitter incoming data packets. Receiver 16, on the other hand, attempts to play-out each packet at its intended time rather than modifying timing information in the PCR packets. This reduces the amount of modification that must be made to PCRs during play-out and ensures that the instantaneous play-out rate is governed by the intended play-out rate of the MPEG transport stream. What is meant by "intended play-out rate" is the rate specified by encoder 12 in the timing information in the PCR packets.

The packet play-out rate is set by receiver 16 in order to prevent the switch fabric output FIFOs from overflowing or under-running. Fine adjustments to the receiver's output clock (oscillator 56 in FIG. 3, described below) are made under software control to match the data packet play-out bit rate to the incoming data packet bit rate. A software feedback mechanism (not shown) in rate scheduling logic 28*d* adjusts the clock of DVB-ASI interface 28 to keep the switch fabric FIFO(s) roughly half full.

The software feedback mechanism includes a buffer manager routine, which obtains instantaneous switch fabric FIFO buffer occupancy levels. If FIFO buffer occupancy starts to fall, a rate control routine slows the receiver's clock (e.g., the clock in DVB-ASI interface 28). If FIFO buffer occupancy starts to increase beyond the buffer "half-full" point, the rate control routine speeds-up the receiver's clock. At the point where the packet output rate matches the packet input rate, the encoder and receiver clocks are synchronized. This means that the amount of time in one count of the receiver's internal time-stamping logic matches the amount of time in one count of the encoder's time-stamping logic. Synchronization of receiver 16 and encoder 12 clocks ensures that sound and video data streams in MPEG transport streams are synchronized identically at the encoder and the receiver, allowing both audio and video to be reproduced at the receiver with relatively little error.

Figure 3A:
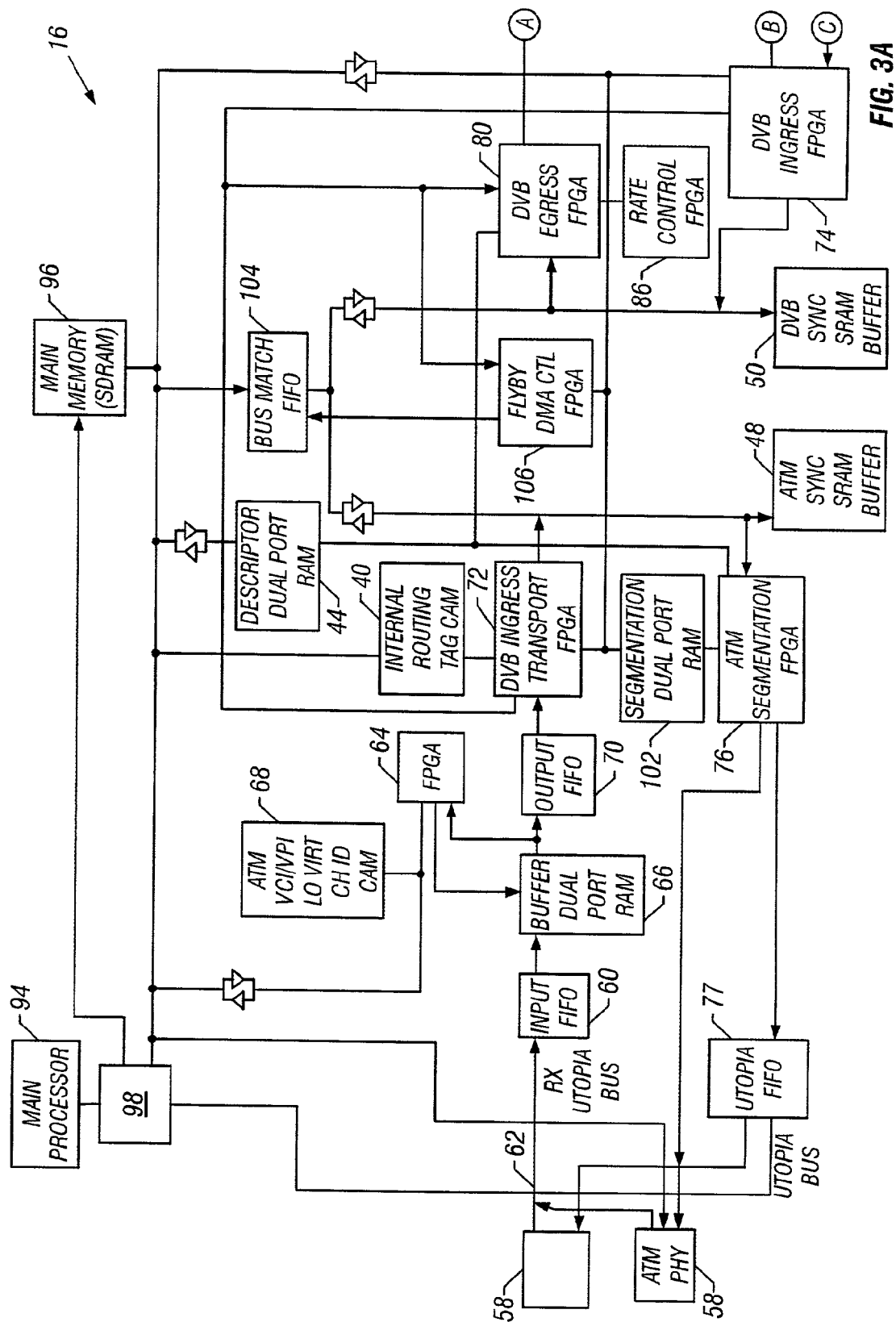
FIG. 3, comprised of FIGS. 3a and 3b, is a low-level block diagram of circuitry contained in the MPEG receiver.
Figure 3B:
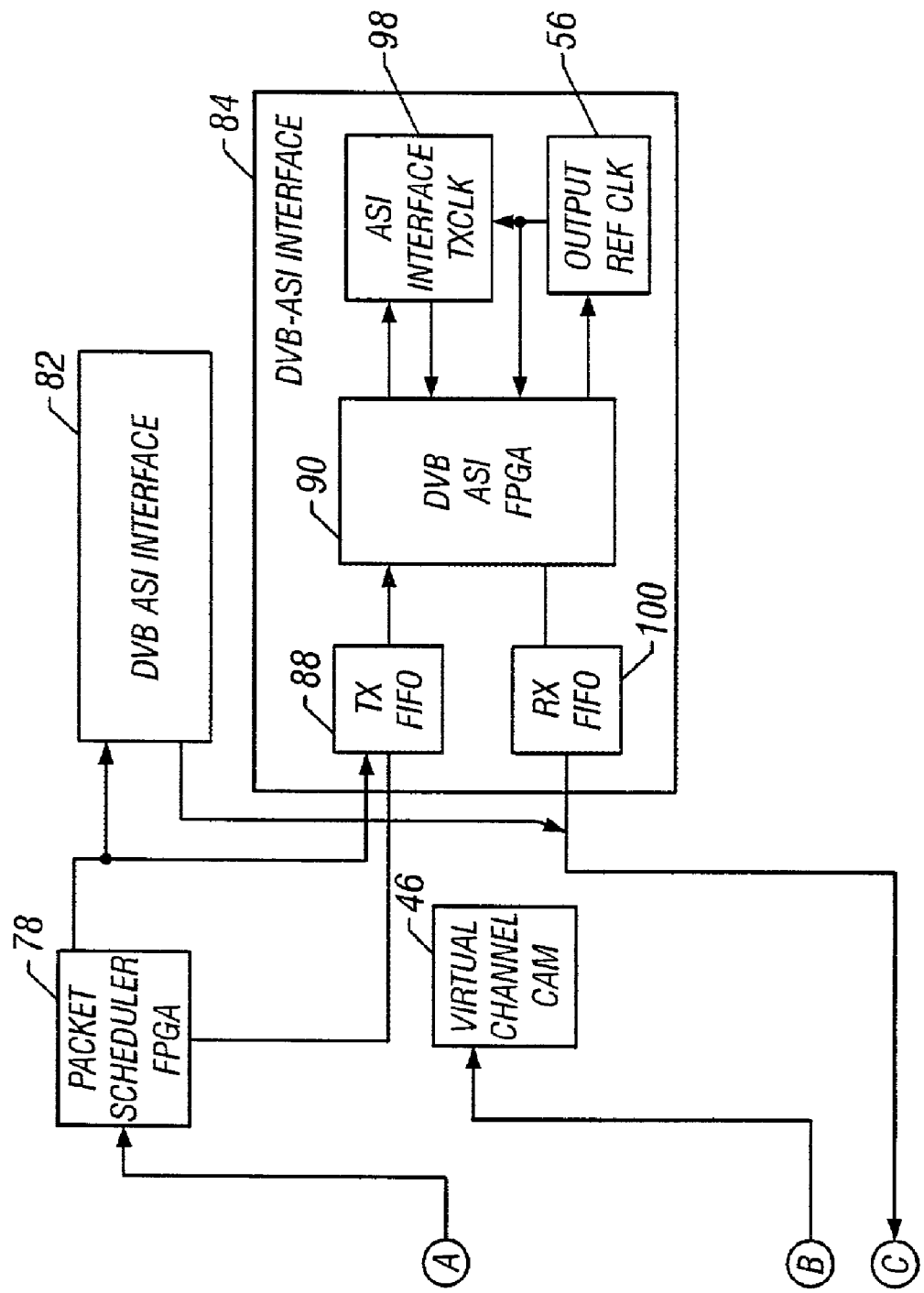

Referring to FIG. 3, a low-level block diagram of circuit components of receiver 16 is shown. In the embodiment shown in FIG. 3, receiver 16 contains circuitry for use with an ATM network; however, appropriate modifications permit its use with any network protocol.

SONET (Synchronous Optical Network) framer interface 58 terminates the physical layer of network (WAN) 18. SONET framer interface 58 is an actual physical interface that decapsulates ATM information mapped into a data packet payload. For the purposes of receiver 16, the SONET layer is a transparent interface. The SONET layer merely provides the physical means for transmitting ATM and MPEG payloads to and from network 18. SONET framer interface 58 stores MPEG packet-bearing ATM cells in input FIFO 60. A "cell" is the unit of transmission in ATM.

The ATM cells are transmitted from SONET framer interface 58 to FIFO 60 via a standard Utopia level one interface 62. Generally speaking, a Utopia level one interface is an eight-bit packet bus that transmits ATM cells from a physical layer termination device to an ATM segmentation and reassembly device. In this embodiment, the ATM cells comprise segmented components of CS-PDUs (Convergence Sublayer—Protocol Data Units) that each contain either one or two 188-byte MPEG transport streams.

Reassembly processor FPGA (Field Programmable Gate Array) 64 reads each incoming ATM cell from dual port RAM (DPRAM) 66 and compares the VPI/VCI (Virtual Path Identifier/Virtual Channel Identifier) of each cell against previously-configured values. A VPI/VCI is a twenty-four bit field (eight bits VPI, sixteen bits VCI)

contained in the five-byte header of an ATM cell that is used for routing and identifying cells in an ATM network. The "previously-configured values" are entries in the CAMs (e.g., CAM 68) that were configured to enable processing of MPEG packets being classified. In receiver 16, the previously-configured values are derived from entries configured by a user via a user interface (not shown).

Reassembly processor FPGA 64 compares the VPI/VCI of each cell against the values in ATM virtual channel CAM 68. The comparison produces a twelve-bit VCI. The twelve-bit VCI is used by reassembly processor FPGA 64 as the address for storing payload contents of the current MPEG ATM cell in buffer dual-port RAM (Random Access Memory) 66. Each unique virtual context (meaning any cell or flow of cells identified by a unique VCI), for which cell payloads are received is stored in reassembly buffers located in buffer dual-port RAM 66. The reassembly buffers are regions of memory used to collect and assemble packets for a particular virtual channel context. In this regard, cells for a virtual context may not arrive contiguously from network 18. That is, cells may arrive that are a subset of a data segment being assembled. Received segments are thus stored so that they can be reassembled when all of the cells for their virtual context have arrived.

Reassembly processor FPGA 64 waits until the entire CS-PDU for each virtual context has been received, determines the payload length from the CS-PDU trailer, and forwards recovered MPEG transport streams to output FIFO 70. A CS-PDU trailer is an eight-byte field at the end of a CS-PDU that contains information about the length of the CS-PDU, together with a checksum for detecting bit errors in the CS-PDU that result from network transmission.

Packet Classification

DVB ingress transport stream FPGA 72 detects storage of MPEG data packets in output FIFO 70 based on the assertion of a flag by that FIFO. The flag indicates that a 188-byte packet is available in FIFO 70. DVB ingress transport stream FPGA 72 stores a prefix and header for the MPEG transport stream (from FIFO 70) in its pipeline processing registers (not shown) and begins packet classification. The prefix includes a VCI that is appended to each packet during incoming classification and two timestamps. The prefix is introduced by receiver 16 and is not part of a normal 188-byte MPEG transport stream. DVB ingress transport stream FPGA 72 classifies a packet by comparing a field, comprised of the VCI and the MPEG transport stream PID, with configured values stored in routing tag CAM 40. The comparison produces a twelve-bit routing tag. FPGA 72 replaces the ATM VCI in the prefix of the packet with this routing tag. The routing tag serves as a pointer to a packet processing descriptor that resides in dual port RAM 44. The packet processing descriptor contains information that relates to manipulating MPEG transport stream packet header information and to the switch fabric buffer destination of a data packet being processed by DVB ingress transport stream FPGA 72.

More specifically, the information in the packet processing descriptor includes one or more descriptors that instruct DVB ingress transport stream FPGA 72 to execute one or more operations on the header of a transport stream. A descriptor is a group of binary words that have specific meaning to DVB ingress transport stream FPGA 72. The descriptors include instructions to modify the current MPEG transport stream's PID, identify transport errors based on a state of a transport error indicator, identify the presence and validity of an MPEG sync-byte, identify a PCR packet, and validate a continuity indicator.

DVB ingress transport stream FPGA 72 modifies MPEG transport stream packet headers based on the packet processing descriptors and forwards the resulting packets to a packet buffer processor (not shown separately) that is contained in DVB ingress transport stream FPGA 72. The packet buffer processor interrogates the packet processing descriptor for the current transport stream and determines the next available buffer address for storage of the packet under consideration. A DMA engine internal to DVB ingress transport stream FPGA 72 is programmed with the appropriate buffer destination address and the length of the packet to be transferred. The buffer destination address is a pointer that indicates the starting location of a memory buffer in the switch fabric memory (e.g., buffers 48 and 50). One MPEG transport stream is stored in a buffer; multiple transport streams are stored in a buffer "pool".

Once the DMA engine has succeeded in bus arbitration, the packet header and the remainder of the packet payload are forwarded to the correct switch fabric buffer located in DVB synchronous SRAM (Static Random Access Memory) buffer 50. Bus arbitration is employed to grant access to memory resources, such as buffer 50. Any device, including transport stream processors (e.g., 72, 74) and forwarding engines (e.g., 76, 78) that requires utilization of switch fabric buffers 48, 50 must first achieve an access grant through bus arbitration before using the switch fabric memory. Bus arbitration ensures that sequential access is maintained to the switch fabric buffers 48, 50. When the transfer by the DMA engine is finished, DVB ingress transport stream FPGA 72 modifies a relevant entry in the buffer descriptor list to indicate that switch fabric buffer 50 contains a valid packet.

Packet Forwarder/Scheduler

DVB egress FPGA 80 interrogates active entries in the buffer descriptor list and determines candidate "egress" buffers that contain MPEG data packets to be forwarded to a specific ASI transmitter 82, 84. Candidate egress buffers must satisfy certain eligibility criteria to be considered for egress. These eligibility criteria relate to the number of packets in the buffer, the type of packets in the buffer, and the validity of the buffer. For example, a buffer may be considered eligible if there are five hundred or more transport streams contained in the buffer, at least one PCR packet is contained in the buffer, the buffer is a valid transmit buffer, and the buffer is configured for forwarding by a user.

Prior to egress from a particular buffer queue, a PCR packet is identified and brought to the head of the queue. When the egress criteria are met, and rate control FPGA 86 has requested that a packet be sent from a particular queue, DVB egress FPGA 86 forwards the packet to packet scheduler FPGA 78. Rate control FPGA 86 contains two request elements—one associated with each of DVB-ASI interfaces 82 and 84. Each request is serviced by a forwarding engine programmed in FPGA 80 and is intended to cause the transfer of packets from an associated switch fabric buffer to a DVB-ASI interface 82, 84 corresponding to an active rate request element. The rate at which requests are generated is determined from information entered by a user and from the available packet rates of a specific DVB-ASI interface 82, 84.

The primary function of packet scheduler FPGA 78 is to determine the optimal piece-wise linear play-out schedule (as shown, e.g., in FIG. 4) for packets destined to each individual DVB-ASI interface 82, 84. As noted above, the play-out schedule is determined from information contained in the PCR packets of each unique MPEG virtual context. Packet scheduler FPGA 78 determines the intended inter-arrival times of the PCR packets and determines the play-out time for a packet under consideration by referencing previously-forwarded PCR packets. Packets that do not contain PCR information are forwarded to an appropriate ASI interface with a nominal delay ($T_{NOM}$ above) value added to their egress time.

ASI transmitter FIFO 88 (in DVB-ASI interface 84) accepts a maximum of five packets concurrently. DVB-ASI FPGA 90 monitors the occupancy of the ASI transmitter FIFO 88 and begins processing the packets as they arrive. That is, DVB-ASI FPGA 90 extracts the packets from the ASI transmitter FIFO 88 and begins to interpret the play-out schedule with relation to its internal time-base. The internal time-base is a counter that runs in sync with a 27 MHz (Megahertz) oscillator 56. When the time indicated by the internal time-base matches the time indicated for a specific packet in the play-out schedule, the packet under consideration is forwarded out of the ASI transmitter FIFO to the appropriate DVB-ASI interface 82, 84. For the duration that the scheduled play-out time for the packet under consideration is greater than an instantaneous value of an internal time-base counter, new entries into the play-out schedule are suspended. This time of suspension is the time $T_{DLY}$, which is noted above and shown in FIG. 4.

When the time indicated in the play-out schedule for a packet under consideration matches the time of the internal time-base, that packet is transmitted from the ASI interface 98 in DVB-ASI interface 84. This operation is referred to as a "transmit opportunity". Rate control is achieved by backpressure to packet scheduler FPGA 78. That is, DVB-ASI FPGA 90 inhibits packet scheduler FPGA 78 from forwarding packets when the occupancy in the transmitter FIFO 88 is five packets and the packet at the head of the queue is waiting for a transmit opportunity. The backpressure to packet scheduler FPGA 78 provides flow control for play-out from the switch fabric buffers 48, 50.

Software Rate Control

DVB-ASI transmitters 82, 84 each contain an internal time-base reference, which is each clocked by a 27 MHz voltage-controlled oscillator (e.g., 56). This time-base, when compared to the intended packet schedule generated by packet scheduler FPGA 78, determines the play-out rate for each MPEG transport stream. The play-out rates, as noted, are determined from timing information (PCR packets—$T_{PCR}$) contained in the MPEG transport streams.

The MPEG encoder/transmitter time-base that generated the timing information in the MPEG PCR packets references a 27 MHz oscillator contained in the encoder/transmitter. As described above, timing errors may result because the frequency generated by 27 MHz voltage-controlled oscillator 56 does not exactly match the frequency generated by the 27 MHz oscillator(s) contained in the encoder/transmitter that generated the MPEG transport streams. These errors cause play-out from the receiver's switch fabric buffers to be slightly slower or faster instantaneously relative to the aggregate rate of the MPEG transport streams filling the switch fabric buffers. In order to compensate for this phenomenon, 27 MHz voltage-controlled oscillator 56 (and/or its counterpart in DVB-ASI interface 82) is adjusted either backward or forward. The amount that 27 MHz voltage-controlled oscillator 56 is adjusted is determined from the average occupancy of switch fabric buffers 48 and 50. A software control mechanism is executed by main processor 94 out of main memory 96 to control the local clock frequencies (Main processor 94 interfaces to main memory 96 and the rest of the circuitry in FIG. 3 through bus interface 98.) The software control mechanism monitors the average occupancy of each active switch fabric buffer transmit queue (buffers 48, 50), determines the accumulated error, and adjusts 27 MHz voltage-controlled oscillator 56 accordingly. Other voltage-controlled oscillators in other DVB-ASI interfaces (e.g., DVB-ASI interface 82) are also adjusted accordingly. The instantaneous occupancy values for each switch fabric buffer 48, 50 is contained in registers located in DVB egress FPGA 80.

In more detail, software running in main processor 94 stores and averages a finite number of buffer occupancy samples. The software determines if the average buffer occupancy over a period of time falls within an acceptable range. The software forms a "virtual region" around the center of each switch fabric buffer. The thresholds are minimum and maximum buffer occupancy marks surrounding the middle of the buffer. The center occupancy mark is reached when the buffer is exactly one-half full. In this embodiment, the two thresholds forming the minimum and maximum acceptable occupancy levels are at the one-third and two-thirds marks, respectively, of each buffer. Occupancies determined to be within the two thresholds are considered "in-range". Occupancies determined to be outside the two thresholds are considered "out-of-range".

If the average occupancy of a buffer is out-of-range, the software running in main processor 94 adjusts 27 MHz voltage-controlled oscillator 56 appropriately. That is, the 27 MHz voltage-controlled oscillator 56 is advanced if the average occupancy is above the maximum threshold. The 27 MHz voltage-controlled oscillator 56 is retarded if the occupancy is below the minimum threshold. This compensation mechanism matches the aggregate error between 27 MHz voltage-controlled oscillator 56 and the 27 MHz oscillator in the MPEG encoder/transmitter. In this manner, the frequency difference between the clocks in encoder/transmitter 12 and receiver 16 is reduced (i.e., the two clocks are substantially synchronized).

DVB-ASI Receiver Interface

DVB-ASI receiver interface 98 is a serial interface that terminates both the physical layer and a data link layer of a communications medium connected to a DVB device (not shown). DVB-ASI receiver interface 98 acts as a transparent data transmission interface that allows information to pass from receiver 16 to a DVB device at 214 Mbps (Mega-bits per second) and vice versa.

DVB-ASI receiver interface 98 propagates recovered data (i.e., MPEG transport streams received from an external DVB device) to DVB-ASI FPGA 90's packet receive engine (not shown). The packet receive engine delineates 188-byte or 204-byte MPEG transport stream packets from the packets. The delineated packets are forwarded to receive FIFO 100. DVB ingress FPGA 74 processes packet inputs from ASI interfaces 82, 84. Packets from the different FIFOs are classified in the manner described above (e.g., based on their PIDs) and provided to ATM Segmentation FPGA 76.

ATM Egress/segmentation

ATM Segmentation FPGA 76 performs a segmentation process that converts MPEG transport streams from DVB devices into the appropriate format for transmission onto network 18 as ATM cells via Utopia FIFO 77. (Reassembly is the reverse process.) The segmentation process of ATM Segmentation FPGA 76 is performed in accordance with the ATM forum AMS1.1 standard. This standard specifies the so-called 8/8 method, in which a CS-PDU comprised of two 188 byte MPEG transport streams is segmented. The CS-PDU length is 384 bytes (i.e., (2*188)+8). The additional eight bytes are trailer information. The trailer includes a checksum, a sixteen-bit length field, and a sixteen-bit user defined field. The CS-PDU is divided into eight forty-eight-byte cell payloads. The cell payloads are then prefixed with the appropriate cell header to form transmit cells.

The MPEG packets are stored in switch fabric memory buffers 48 and 50. ATM Segmentation FPGA 76 functions as an egress processor and accesses switch fabric buffers 48 and 50 directly. ATM Segmentation FPGA 76 ensures the presence of at least two MPEG packets in a switch fabric buffer group prior to segmenting a CS-PDU.

A packet is marked as invalid in the switch fabric buffers when ATM Segmentation FPGA 76 has transmitted a cell specific to that packet. ATM Segmentation FPGA 76 manages sixty-four concurrent unique egress buffer groups. Transmit descriptor entries for ATM Segmentation FPGA 76 express the egress source pool, frequency and order of cells transmitted by receiver 16. A transmit descriptor ring establishes the bandwidth utilization for each unique ATM channel being serviced. Each entry in the range allocates forty-four Kbps (Kilo-bits per second) to the channel indicated by the ring entry. In this embodiment, the transmit descriptor ring is a three thousand word region of dual port RAM (DPRAM). Each transmit ring entry is an eighteen-bit DPRAM entry referenced as a single long word (thirty-two-bit) access that refers to a transmit descriptor block in the DRAM.

The transmit descriptor block is a group of sixteen eighteen-bit locations in DPRAM 102 that are accessed as long word addresses. The transmit descriptor block describes and stores segmentation channel specific information used by ATM Segmentation FPGA 76. A transmit descriptor block can be referenced in the queue (located, e.g., dual port RAM 102 of FIG. 3) multiple times.

A ring entry location represents one transmit cell period in the transmit queue. The number and locus of entries of a descriptor block referenced in the transmit ring determines the cell rate and burstiness of the ATM cell flow. The transmit descriptor dual port RAM 8 indicates the source buffer in the switch fabric for segmentation and contains the cell header and partial context for each of sixty-four transmit threads.

The ATM cell transmission rate is determined by taking the product of the sum of valid transmit ring entries for a segmentation channel and the transmit ring entry bandwidth density. Transmit ring entry bandwidth (TREB) density is determined as follows:

$$TREB=[\#bits/((\#entries*\#bits)/max\_cell\_rate)], \quad (2)$$

where #bits is the number of bits in a cell (424 in this embodiment), #entries is the number of entries in a ring (3000 in this embodiment), and max_cell_rate is the maximum cell rate of an OC-3 SONET interface ($132 \times 10^6$ in this embodiment).

Software Packet Insertion

A packet insertion subsystem enables main processor 94 to propagate MPEG packets into buffers 48, 50. The packets contain program-specific information inserted into transport streams, which are transmitted via the DVB-ASI transmitter interfaces 82, 84. The program-specific information includes tables and other data specific to the MPEG protocol, which are used to form a program-specific hierarchy of MPEG packet constructs.

Main processor 94 receives information that is input through a user interface application (not shown). The input information includes a description of an MPEG transport stream that has been multiplexed from a collection of MPEG packets presented at one or more inputs to receiver 16. Main processor 94 determines and assembles a table for insertion in main memory 96.

Periodically, main processor 94 transfers the table information to bus match FIFO 104 using a DMA (Direct Memory Access) controller contained in Flyby FPGA 106. Flyby FPGA 106 contains interface logic, which can be programmed to autonomously transfer exactly one MPEG transport stream (188 bytes) to bus match FIFO 104. Main processor 94 is notified that a transfer is complete by flyby FPGA 104. Main processor 94 subsequently programs flyby FPGA 104 to transfer packets from bus match FIFO 104 to main switch fabric buffers 48, 50. The location in main switch fabric buffers 48, 50 corresponds to a queue being forwarded to/from a DVB-ASI transmitter 82, 84.

Architecture

Although receiver 16 is described primarily in a hardware context, it is not limited as such. Receiver may find applicability in any computing or processing environment. Receiver 16 may be implemented in hardware (e.g., an ASIC {Application-Specific Integrated Circuit} and/or an FPGA {Field Programmable Gate Array}), software, or a combination of hardware and software.

All or part of receiver 16 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform the functions described herein, such as determining a play-out schedule to reduce jitter.

All or part of receiver 16 may also be implemented as a computer-readable storage medium, configured with a computer program, where, upon execution, instructions in the computer program cause the computer to operate to perform the functions described herein.

The invention is not limited to the specific embodiments shown in FIGS. 1 to 4. The invention is not limited to use in an ATM context or to use with any particular version of MPEG. For example, the invention may be used with MPEG-1, MPEG-2, MPEG-4, MPEG-7, and is extendible to any other compression technique that uses the same, or similar, time-stamping mechanisms as MPEG.

Other embodiments not described herein are also within the scope of the following claims.

The invention claimed is:

1. A method of transmitting data packets received from a source via a non-constant delay medium, the non-constant delay medium introducing jitter into the data packets, the method comprising:

storing the data packets in a buffer, the data packets being part of a single transport stream that by definition includes first and second data packets that contain time stamps and plural data packets between the first and second data packets that do not contain time stamps;

determining a play-out schedule for the data packets based on the time stamps and an amount of data in the data packets, wherein the play-out schedule is determined without altering the time stamps;

transmitting the data packets from the buffer in accordance with the play-out schedule, wherein the plural data packets are transmitted at a different rate than the first and second data packets in order to reduce the jitter; and implementing a clock synchronization process that uses the time stamps to synchronize play-out of the data packets to a clock of the source.

2. The method of claim 1, wherein the play-out schedule is determined based on a difference between time-stamps in the first and second data packets.

3. The method of claim 2, wherein the play-out schedule controls play-out of the first and second data packets at times that correspond to the time-stamps.

4. The method of claim 2, wherein plural data packets that do not contain time-stamps are transmitted between the first and second data packets such that a delay exists between the second data packet and a last one of the plural data packets.

5. The method of claim 1, wherein the plural data packets are transmitted at a higher rate than the first and second data packets.

6. The method of claim 1, further comprising:
identifying the transport stream;
wherein the play-out schedule is also determined based on the identified transport stream.

7. The method of claim 6, wherein the transport stream is identified based on a packet identifier in at least one of the first and second data packets.

8. The method of claim 7, wherein the transport stream comprises an MPEG (Motion Picture Experts Group) program stream that includes audio and video information.

9. The method of claim 1, further comprising:
storing data packets for a second transport stream in the buffer;
wherein, if the play-out schedule indicates that first or second data packets are to be transmitted at the same time as a third data packet in the second transport stream, the method further comprises:
changing timing information in the third data packet to indicate that the third data packet is to be transmitted after the first or second data packet.

10. The method of claim 9, further comprising changing timing information in other packets in the second transport stream.

11. The method of claim 1, further comprising:
determining an occupancy level of the buffer; and
changing a frequency of a clock signal used for play-out based on the occupancy level of the buffer.

12. The method of claim 11, wherein the frequency of the clock signal is changed so that the frequency corresponds to the frequency of the clock of the source that was used to produce the data packets.

13. An apparatus for transmitting data packets received from a source via a non-constant delay medium, the non-constant delay medium introducing jitter into the data packets, the apparatus comprising:
a buffer to store the data packets, the data packets being part of a single transport stream that by definition includes first and second data packets that contain time stamps and plural data packets between the first and second data packets that do not contain time stamps;

a scheduler to determine a play-out schedule for the data packets based on the time stamps and an amount of data in the data packets, wherein the play-out schedule is determined without altering the time stamps;

an interface to transmit the data packets from the buffer in accordance with the play-out schedule, wherein the plural data packets are transmitted at a different rate than the first and second data packets in order to reduce the jitter; and circuitry to implement a clock synchronization process that uses the time stamps to synchronize play-out of the data packets to a clock of the source.

14. The apparatus of claim 13, wherein the play-out schedule is determined based on a difference between the time-stamps in the first and second data packets.

15. The apparatus of claim 14, wherein the play-out schedule controls play-out of the first and second data packets at times that correspond to the time-stamps.

16. The apparatus of claim 14, wherein the plural data packets that do not contain time-stamps are transmitted between the first and second two data packets such that a delay exists between the second data packet and a last one of the plural data packets.

17. The apparatus of claim 13, wherein the plural data packets are transmitted at a higher rate than the first and second data packets.

18. The apparatus of claim 13, further comprising:
a classification engine which identifies the transport stream
wherein the scheduler determines the play-out schedule also based on the identified transport stream.

19. The apparatus of claim 18, wherein the transport stream is identified based on a packet identifier in the first and second data packets.

20. The apparatus of claim 19, wherein the transport stream comprises an MPEG (Motion Picture Experts Group) program stream that includes audio and video information.

21. The apparatus of claim 13, wherein data packets for a second transport stream are stored in the buffer; and
if the play-out schedule indicates that first or second data packets are to be transmitted at the same time as a third data packet in the second transport stream, the scheduler changes timing information in the third data packet to indicate that the third data packet is to be transmitted after the first or second data packet.

22. The apparatus of claim 21, wherein the scheduler changes timing information in other packets in the second transport stream.

23. The apparatus of claim 13, further comprising a processor that determines an occupancy level of the buffer and that changes a frequency of a clock signal used for play-out based on the occupancy level of the buffer.

24. The apparatus of claim 23, wherein the frequency of the clock signal is changed so that the frequency corresponds to the frequency of the clock signal that was used by the source to produce the data packets.

25. An apparatus for transmitting data packets received from a source via a non-constant delay medium, the non-constant delay medium introducing jitter into the data packets, the apparatus comprising:
means for storing the data packets in a buffer, the data packets being part of a single transport stream that by definition includes first and second data packets that contain time stamps and plural data packets between the first and second data packets that do not contain time stamps;

means for determining a play-out schedule for the data packets based on the time stamps and an amount of data in the data packets, wherein the play-out schedule is determined without altering the time stamps;

means for transmitting the data packets from the buffer in accordance with the play-out schedule, wherein the plural data packets are transmitted at a different rate than the first and second data packets in order to reduce the jitter; and means for implementing a clock synchronization process that uses the time stamps to synchronize play-out of the data packets to a clock of the source.

26. A computer program stored on a computer-readable medium for transmitting data packets received from a source via a non-constant delay medium, the non-constant delay medium introducing jitter into the data packets, the computer program comprising instructions that cause a machine to:

store the data packets in a buffer, the data packets being part of a single transport stream that by definition includes first and second data packets that contain time stamps and plural data packets between the first and second data packets that do not contain time stamps;

determine a play-out schedule for the data packets based on the time stamps and an amount of data in the data packets, wherein the play-out schedule is determined without altering the time stamps;

transmit the data packets from the buffer in accordance with the play-out schedule, wherein the plural data packets are transmitted at a different rate than the first and second data packets in order to reduce the jitter; and implement a clock synchronization process that uses the time stamps to synchronize play-out of the data packets to a clock of the source.

* * * * *